US011657205B2

(12) United States Patent
Sherlekar et al.

(10) Patent No.: US 11,657,205 B2
(45) Date of Patent: May 23, 2023

(54) CONSTRUCTION, MODELING, AND MAPPING OF MULTI-OUTPUT CELLS

(71) Applicant: Synopsys, Inc., Mountain View, CA (US)

(72) Inventors: Deepak Dattatraya Sherlekar, Cupertino, CA (US); Mohammad Ziaullah Khan, Folsom, CA (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 17/486,456

(22) Filed: Sep. 27, 2021

(65) Prior Publication Data
US 2022/0121802 A1 Apr. 21, 2022

Related U.S. Application Data

(60) Provisional application No. 63/092,865, filed on Oct. 16, 2020.

(51) Int. Cl.
*G06F 30/392* (2020.01)
*G06F 30/3315* (2020.01)
*G06F 119/12* (2020.01)
*G06F 111/20* (2020.01)

(52) U.S. Cl.
CPC ........ *G06F 30/392* (2020.01); *G06F 30/3315* (2020.01); *G06F 2111/20* (2020.01); *G06F 2119/12* (2020.01)

(58) Field of Classification Search
CPC .............. G06F 30/392; G06F 30/3315; G06F 2111/20; G06F 2119/12; G06F 30/3323; G06F 30/327
See application file for complete search history.

(56) References Cited

U.S. PATENT DOCUMENTS

| | | | | |
|---|---|---|---|---|
| 7,496,867 | B2* | 2/2009 | Turner | G06F 30/30 716/133 |
| 8,015,517 | B1* | 9/2011 | Reis | G06F 30/327 716/132 |
| 8,302,057 | B2* | 10/2012 | Saika | H01L 27/0207 716/134 |
| 8,607,185 | B1* | 12/2013 | Andersen | G06F 30/327 716/135 |
| 8,762,922 | B1* | 6/2014 | Roy | G06F 30/327 716/135 |
| 8,898,610 | B1* | 11/2014 | Tagore-Brage | G06F 30/30 716/119 |
| 10,089,428 | B2* | 10/2018 | Chowdhury | G06F 30/39 |
| 10,346,578 | B2* | 7/2019 | Patel | G06F 30/398 |
| 10,691,856 | B1* | 6/2020 | Lysaght | G06F 30/392 |
| 2007/0028197 | A1* | 2/2007 | Santoso | G06F 30/30 716/103 |

(Continued)

*Primary Examiner* — Nha T Nguyen
(74) *Attorney, Agent, or Firm* — Patterson + Sheridan, LLP

(57) ABSTRACT

A method includes receiving a design file for a circuit design and receiving a library that defines a cell that includes one or more inputs, a first combinational logic circuit element, a second combinational logic circuit element, a first output, and a second output. The method also includes replacing a plurality of circuit elements in the circuit design with the cell and compiling the circuit design after replacing the plurality of circuit elements with the cell. The first and second outputs of the cell in the compiled circuit design replace a plurality of outputs of the plurality of circuit elements.

20 Claims, 7 Drawing Sheets

(56) References Cited

U.S. PATENT DOCUMENTS

| | | | |
|---|---|---|---|
| 2009/0249259 A1* | 10/2009 | Penzes | G06F 30/327 716/100 |
| 2010/0070933 A1* | 3/2010 | Quach | G06F 30/3312 716/132 |
| 2010/0229143 A1* | 9/2010 | Shi | G06F 30/3312 716/132 |
| 2013/0019221 A1* | 1/2013 | Reis | G06F 30/30 716/132 |
| 2019/0172823 A1* | 6/2019 | Chen | G06F 30/392 |

* cited by examiner

INVBUF_1

ND2AN2_1

AOI22AO22_1

CONSTRUCTION, MODELING, AND MAPPING OF MULTI-OUTPUT CELLS

CROSS-REFERENCE TO RELATED APPLICATIONS

This application claims priority to and the benefit of U.S. Provisional Patent Application Ser. No. 63/092,865, entitled "Construction, Modeling, and Mapping of a New Class of Multi-output Cells Promoting High Level of Shared Logic in Cell-based Physical Design," filed Oct. 16, 2020, which is incorporated herein by reference in its entirety.

TECHNICAL FIELD

The present disclosure relates to circuit design, and specifically to the compilation of circuit designs. Moreover, the present disclosure relates to the design of a new class of cells for cell-based chip design, and the use of such cells in technology mapping and optimization in a digital design implementation flow.

BACKGROUND

Cell based design is the dominant methodology for automated design of modern digital semiconductor chips. This methodology uses a collection of tools in the digital design automation flow to implement large, complex designs. The implementation flow maps a design expressed in a language such as Verilog to a netlist of interconnected instances of elements from a library of pre-built building blocks (called cells), places the instances on the chip, and routes wires connecting the instances so as to achieve the target performance while minimizing power and area. A cell in the library may implement a single function, a collection of independent functions, or a collection of inter-dependent functions. The timing model of a cell captures the behavior of its timing arcs from inputs to each output as a function of its input signals and loads on its outputs. Two broad categories of cells are present in logic cell libraries: combinational logic cells and sequential cells. The former is used to implement complex logic functions of a computation while the latter is used to store intermediate states of the computation.

Most combinational logic cells in a library implement simple single-stage or two-stage circuits with a single output. These cells are used in general purpose logic mapping and optimization. Special purpose cells used by dedicated software to implement arithmetic or other specialized logic are exceptions to this rule. The dedicated software implements portions that precede general purpose logic synthesis and optimization. General purpose logic optimization also optimizes special purpose logic in the context of the overall design.

In the course of optimization in the design flow, many complex special purpose and multi-stage general purpose cells are replaced by equivalent single stage logic cells. This happens for two reasons:
1. Sharing of subexpressions is not possible when the expression is mapped to a complex cell.
2. The ratio of drive strengths between successive stages of logic (referred to as gain) in a complex cell is fixed. The library may include multiple cells implementing the same function with different gains, but the number of gains supported in library cells is limited.

If a smaller gain to improve performance, or a larger gain to reduce power/area is not available as a cell variant, the complex cell is decomposed into cells corresponding to its building blocks.

SUMMARY

According to an embodiment, a method for compiling a circuit design includes receiving a circuit design and receiving a definition of a cell that includes one or more inputs, a first combinational logic circuit element, a second combinational logic circuit element, a first output, and a second output. The one or more inputs are coupled to the first combinational logic circuit element and an output of the first combinational logic circuit element is coupled to an input of the second combinational logic circuit element. The first output of the cell is the output of the first combinational logic circuit element and the second output of the cell is an output of the second combinational logic circuit element. The method also includes replacing a plurality of circuit elements in the circuit design with the cell and compiling the circuit design after replacing the plurality of circuit elements with the cell. The first and second outputs of the cell in the compiled circuit design replace a plurality of outputs of the plurality of circuit elements.

The method may also include determining a delay for the cell based on a timing model for the cell. The timing model presents the delay for the cell as a function of an input slew of the cell, a load on the first output of the cell, and a load on the second output of the cell.

Replacing the plurality of circuit elements with the cell may be based on determining that the cell has a smaller area than the plurality of circuit elements.

Replacing the plurality of circuit elements with the cell may be based on determining that the cell has a lower power consumption than the plurality of circuit elements.

An input of the one or more inputs may be coupled to an input of the second combinational logic circuit element.

The cell may include a third combinational logic circuit element and a third output. The output of the second combinational logic circuit element may be coupled to an input of the third combinational logic circuit element. The third output may be an output of the third combinational logic circuit element.

The method may also include coupling the first and second outputs to one or more cells.

The definition of the cell may be received in a logic cell library that includes a second cell that is functionally equivalent to the cell and has a gain that is (i) less than or equal to one and (ii) lower than a gain of the cell.

The method may also include adding the cell to a library comprising a second cell that is identical to the cell except the second cell lacks the first output.

According to another embodiment, an apparatus includes a memory and a hardware processor communicatively coupled to the memory. The hardware processor receives (i) a design file for the circuit design and (ii) a logic cell library that defines a cell that includes one or more inputs, a first combinational logic circuit element, a second combinational logic circuit element, a first output, and a second output. The one or more inputs are coupled to the first combinational logic circuit element. The output of the first combinational logic circuit element is coupled to an input of the second combinational logic circuit element. The first output of the cell is the output of the first combinational logic circuit element. The second output of the cell is an output of the second combinational logic circuit element. The hardware processor also replaces a plurality of circuit elements in the circuit design with the cell and compiles the circuit design after replacing the plurality of circuit elements with the cell. The first and second outputs of the cell in the compiled circuit design replace a plurality of outputs of the plurality of circuit elements.

The hardware processor may also determine a delay for the cell based on a timing model for the cell. The timing model presents the delay for the cell as a function of an input slew of the cell, a load on the first output of the cell, and a load on the second output of the cell.

Replacing the plurality of circuit elements with the cell may be based on determining that the cell has a smaller area than the plurality of circuit elements.

Replacing the plurality of circuit elements with the cell may be based on determining that the cell has a lower power consumption than the plurality of circuit elements.

An input of the one or more inputs may be coupled to an input of the second combinational logic circuit element.

The cell may include a third combinational logic circuit element and a third output. The output of the second combinational logic circuit element may be coupled to an input of the third combinational logic circuit element. The third output may be an output of the third combinational logic circuit element.

The hardware processor may also couple the first and second outputs to one or more cells.

The logic cell library may include a second cell that is functionally equivalent to the cell and has a gain that is (i) less than or equal to one and (ii) lower than a gain of the cell.

According to another embodiment, a non-transitory computer-readable medium stores instructions that when executed by a processor, cause the processor to perform an operation that includes replacing a plurality of circuit elements in a circuit design with a cell comprising a first combinational logic circuit element and a second combinational logic circuit element. An output of the first combinational logic circuit element is coupled to an input of the second combinational logic circuit element. A first output of the cell is the output of the first combinational logic circuit element. A second output of the cell is an output of the second combinational logic circuit element. The operation also includes compiling the circuit design. The first and second outputs of the cell in the compiled circuit design replace a plurality of outputs of the plurality of circuit elements.

The operation may also include determining a delay for the cell based on a timing model for the cell. The timing model presents the delay for the cell as a function of an input slew of the cell, a load on the first output of the cell, and a load on the second output of the cell.

Replacing the plurality of circuit elements with the cell may be based on determining that the cell has a smaller area than the plurality of circuit elements.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to construction, modeling, and mapping of a new class of multi-output cells promoting a high level of shared logic in cell-based physical design. Generally, the disclosure contemplates a compilation process in which circuit elements of a circuit design are replaced by a multi-output cell. The cell may include multiple circuit elements, with the intermediate outputs of the cell being exposed to serve as the outputs of the cell. In this manner, one or both of the area or power consumption of the circuit design is reduced in certain embodiments. Stated differently, the compilation process systematically constructs multi-stage cells in digital logic cell libraries to expose intermediate logic functions in the cells, thus enabling common subexpression sharing to improve the power usage and to reduce the area of complex general-purpose logic. It also makes incremental changes to cell mapping to infer these cells in place of conventional, single-output multi-stage cells, and to make use of the intermediate outputs to improve design area and power. The new cells account for an overwhelming proportion of multi-stage cells used at the chip level in most designs, offering significant area and power savings in certain embodiments.

Figure 1:
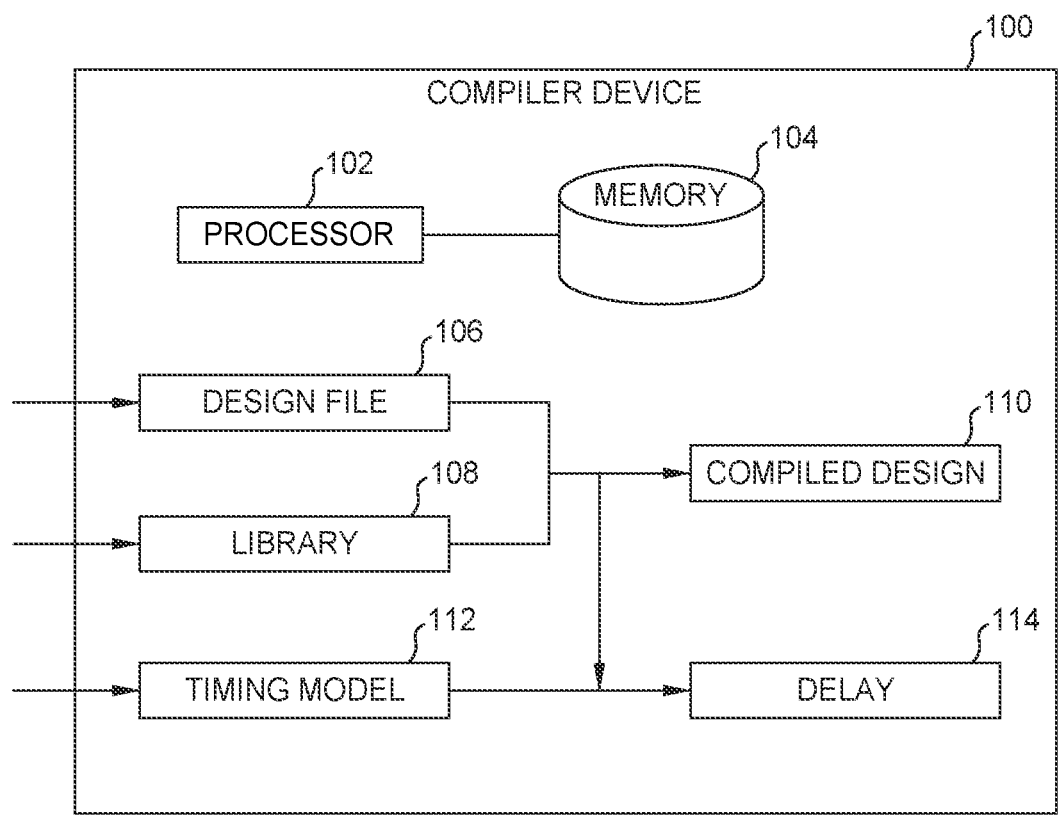
FIG. 1 illustrates an example compiler device.

FIG. 1 illustrates an example compiler device 100. As seen in FIG. 1, the compiler device 100 includes a processor 102 and a memory 104, which may perform any of the functions of the compiler device 100 described herein. Generally, the compiler device 100 compiles circuit designs to replace certain circuit elements with multi-output cells, with some intermediate outputs of the cells being exposed to serve as the outputs of the cells. In particular embodiments, the compiler device 100 reduces the area or power consumption of the circuit design.

Processor 102 is any electronic circuitry, including, but not limited to microprocessors, application specific integrated circuits (ASIC), application specific instruction set processor (ASIP), and/or state machines, that communicatively couples to memory 104 and controls the operation of compiler device 100. Processor 102 may be 8-bit, 16-bit, 32-bit, 64-bit or of any other suitable architecture. Processor 102 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 102 may include other hardware that operates software to control and process information. Processor 102 executes software stored on memory to perform any of the functions described herein. Processor 102 controls the operation and administration of compiler device 100 by processing information received from a user device or memory 104. Processor 102 may be a programmable logic device, a microcontroller, a microprocessor, any suitable processing device, or any suitable combination of the preceding. Processor 102 is not limited to a single processing device and may encompass multiple processing devices.

Memory 104 may store, either permanently or temporarily, data, operational software, or other information for processor 102. Memory 104 may include any one or a combination of volatile or non-volatile local or remote devices suitable for storing information. For example, memory 104 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 104, a disk, a CD, or a flash drive. In particular embodiments, the software may include an application executable by processor 102 to perform one or more of the functions described herein.

As seen in FIG. 1, the compiler device 100 receives a design file 106 and a logic cell library 108. The design file 106 includes a circuit design to be compiled by the compiler device 100. The library 108 includes definitions of cells to be used during the compilation process. The cells may include multiple circuit elements and the intermediate outputs of the cells may be exposed to serve as the outputs of the cells. Generally, the compiler device 100 replaces multiple circuit elements in the design file 106 with a cell in the library 108 during compilation to produce a compiled design 110. In this manner, the area or power consumption of the circuit is reduced in certain embodiments. In some embodiments, the compiler device 100 adds to the library a cell that is identical to another cell in the library except the added cell has its intermediate outputs exposed whereas the other cell does not.

In some embodiments, the compiler device 100 also receives a timing model 112 for one or more cells in the library 108. The compiler device 100 uses the timing model 112 to determine a delay 114 for the compiled design 110 and for each cell in the compiled design 110. The timing model 112 may present the delays of individual cells as a function of input slews and the loads on the outputs of the cells (e.g., both the intermediate output(s) and the final output). The delay 114 may be used to characterize and model the compiled design 110.

FIGS. 2A through 2H illustrate example cells used by the compiler device 100 of FIG. 1. Generally, each of the example cells include multiple outputs, with at least one output being an exposed intermediate output of the cell. In some embodiments, the compiler device 100 adds one or more of these example cells to a library. The compiler device 100 adds an example cell in response to determining that the library contains another cell that is identical to the example cell but the other cell does not have an intermediate output exposed like the example cell. As a result, the compiler device adds the example cell to the library so that the library contains a version of the other cell that has the intermediate output exposed.

Figure 2A:
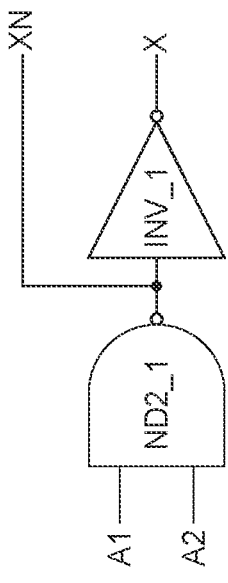
FIG. 2A illustrates an example cell used by the compiler device of FIG. 1.

FIG. 2A illustrates an inverter buffer cell (INVBUF_1) that includes two inverters (INV_1) coupled in sequence. A first inverter receives an input A, and the output of the first inverter is coupled to an input of a second inverter. The second inverter outputs X, which should be equivalent to A. Additionally, the output of the first inverter is exposed and serves as an additional output XN, which should be the complement of A. Generally, the inverter buffer cell can replace a circuit element that complements an input and a circuit element that buffers the input.

Figure 2B:
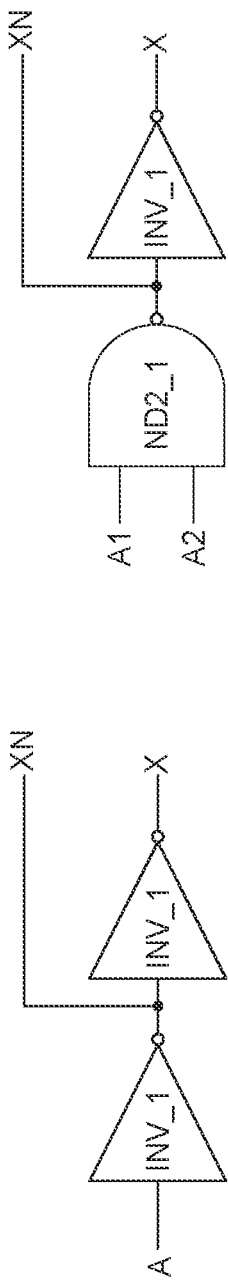
FIG. 2B illustrates an example cell used by the compiler device of FIG. 1.

FIG. 2B illustrates a cell (ND2AN2_1) that includes a NAND gate (ND2_1) and an inverter (INV_1) coupled in sequence. The NAND gate receives inputs A1 and A2, and the output of the NAND gate is coupled to an input of the inverter. The inverter outputs X, which should be equivalent to A1 AND A2. Additionally, the output of the NAND gate is exposed and serves as an additional output XN, which should be equivalent to A1 NAND A2. Generally, this cell can replace a circuit element that NANDs two inputs and a circuit element that ANDs the two inputs.

Figure 2C:
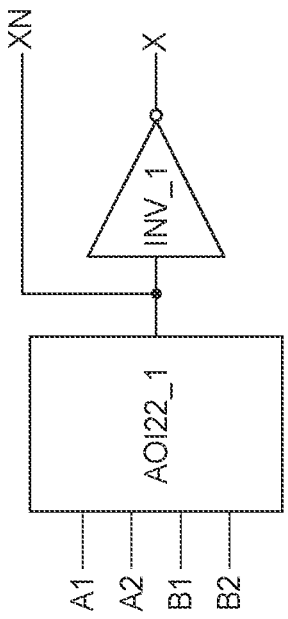
FIG. 2C illustrates an example cell used by the compiler device of FIG. 1.

FIG. 2C illustrates a cell (AOI22AO22_1) that includes an AND-OR-INVERT (AOI22_1) and an inverter (INV_1). The AND-OR-INVERT receives inputs A1, A2, B1, and B2, and the output of the AND-OR-INVERT is coupled to an input of the inverter. The inverter outputs X, which should be equivalent to (A1 AND A2) OR (B1 AND B2). Additionally, the output of the AND-OR-INVERT is exposed and serves as an additional output XN, which should be equivalent to (A1 AND A2) NOR (B1 AND B2). Generally, this cell can replace a circuit element that performs an AND-OR-Invert and a circuit element that complements the AND-OR-Invert.

Figure 2D:
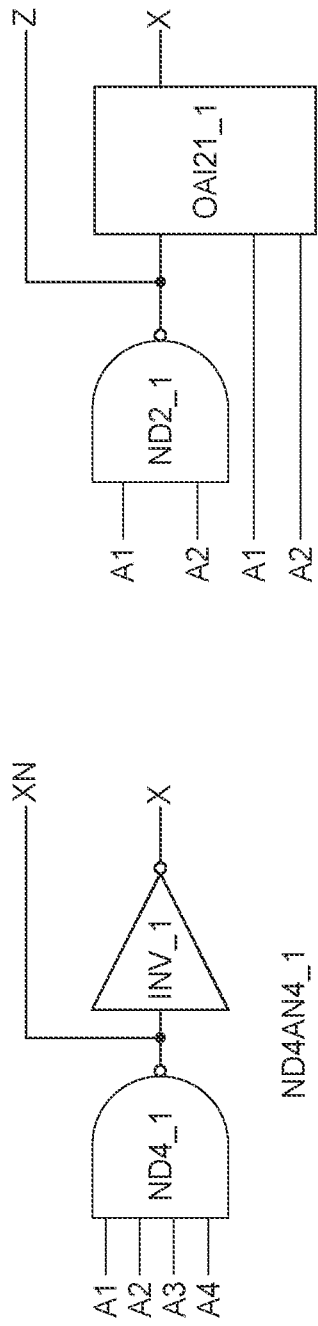
FIG. 2D illustrates an example cell used by the compiler device of FIG. 1.

FIG. 2D illustrates a cell (ND4AN4_1) that includes a NAND gate (ND4_1) and an inverter (INV_1) coupled in sequence. The NAND gate receives inputs A1, A2, A3, and A4, and the output of the NAND gate is coupled to an input of the inverter. The inverter outputs X, which should be equivalent to A1 AND A2 AND A3 AND A4. Additionally, the output of the NAND gate is exposed and serves as an additional output XN, which should be equivalent to A1 NAND A2 NAND A3 NAND A4. Generally, this cell can replace a circuit element that NANDs four inputs and a circuit element that ANDs the four inputs.

Figure 2E:
FIG. 2E illustrates an example cell used by the compiler device of FIG. 1.

FIG. 2E illustrates a cell (ND2EN2_1) that includes a NAND gate (ND2_1) and an OR-AND-INVERT (OAI21_1), which may be used to build specialized arithmetic functions such as parallel-prefix comparators. The NAND gate receives inputs A1 and A2, and the output of the NAND gate is coupled to an input of the OR-AND-INVERT. The OR-AND-INVERT receives A1 and A2 as additional inputs and outputs X. Thus X is OAI21(A1, A2, (A1 NAND A2)), which is equivalent to EN2(A1, A2), where EN2 is the 2-input exclusive-NOR function. Additionally, the output of the NAND gate is exposed and serves as an additional output Z, which should be equivalent to A1 NAND A2. Stated differently, the outputs of this cell are a 2-input NAND (ND2) and a 2-input exclusive-NOR (EN2). In this cell, the output of the input stage ND2 which drives an input of the OR-AND-INVERT function in the output stage is also exposed as another output. The EN2 output may be modeled as a function of the two inputs—A1 and A2—as well as the load on the ND2 output, resulting in a 3-dimensional table. In certain embodiments, the cell may be used not just for specialized arithmetic, but also general purpose logic (sometimes referred to as random logic).

Figure 2F:
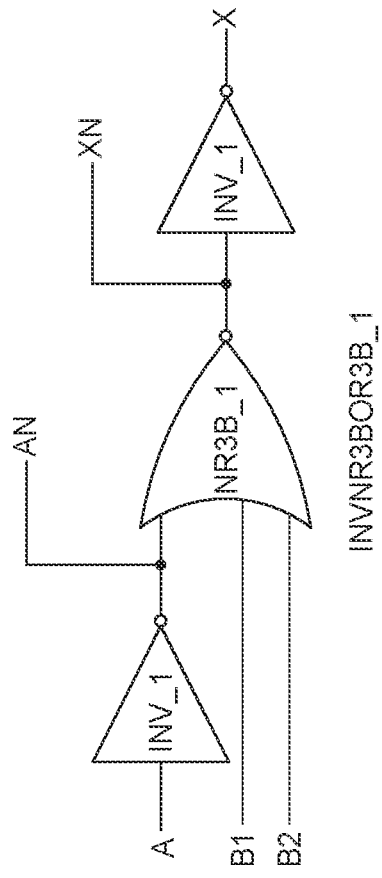
FIG. 2F illustrates an example cell used by the compiler device of FIG. 1.

FIG. 2F illustrates a cell (INVNR3BOR3B_1) that includes a first inverter (INV_1), a NOR gate (NR3B_1), and a second inverter (INV_1). The first inverter receives input A, and the output of the first inverter is coupled to an input of the NOR gate. The NOR gate receives additional inputs B1 and B2, and the output of the NOR gate is coupled to an input of the second inverter. The second inverter outputs X, which should be equivalent to $\overline{A}$ OR B1 OR B2. Additionally, the output of the NOR gate is exposed and serves as an additional output XN, which should be equivalent to $\overline{A}$ NOR B1 NOR B2. Furthermore, the output of the inverter is exposed and serves as an additional output AN, which should be equivalent to $\overline{A}$. Generally, this cell can replace a circuit element that inverts A, a circuit element that NORs $\overline{A}$, B1, and B2, and a circuit element that ORs $\overline{A}$, B1, and B2. Additionally, the timing arc from A to X is a function of input slew at A, the output load on X, and the loads on XN and AN, resulting in a four-dimensional table.

Figure 2H:
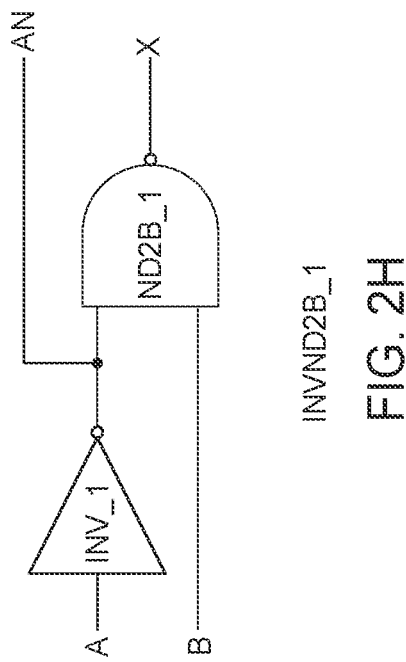
FIG. 2H illustrates an example cell used by the compiler device of FIG. 1.
Figure 2G:
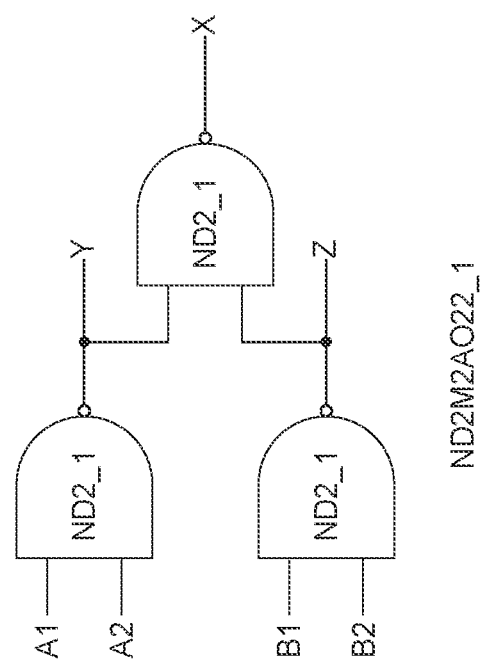
FIG. 2G illustrates an example cell used by the compiler device of FIG. 1.

FIG. 2G illustrates a cell (ND2M2AO22_1) that includes three NAND gates (ND2_1). The first NAND gate receives inputs A1 and A2, and the output of the first NAND gate is coupled to an input of the third NAND gate. The second NAND gate receives inputs B1 and B2, and the output of the second NAND gate is coupled to an input of the third NAND gate. The third NAND gate outputs X, which should be equivalent to (A1 AND A2) OR (B1 AND B2). Additionally, the output of the first NAND gate is exposed and serves as an additional output Y, which should be equivalent to A1 NAND A2. Moreover, the output of the second NAND gate is exposed and serves as an additional output Z, which should be equivalent to B1 NAND B2. Generally, this cell can replace a circuit element that ORs (A1 AND A2) and (B1 And B2), a circuit element that NANDs A1 and A2, and a circuit element that NANDs B1 and B2.

FIG. 2H illustrates a cell (INVND2B_1) that includes an inverter (INV_1) and a NAND gate (ND2B_1). The inverter receives an input A, and the output of the inverter is coupled to an input of the NAND gate. The NAND gate receives an additional input B and outputs X, which should be equivalent to A NAND B. Additionally, the output of the inverter is exposed and serves as an additional output AN, which should be equivalent to A. Generally, this cell can replace a circuit element that NANDs A and B and a circuit element that inverts A.

Figure 3:
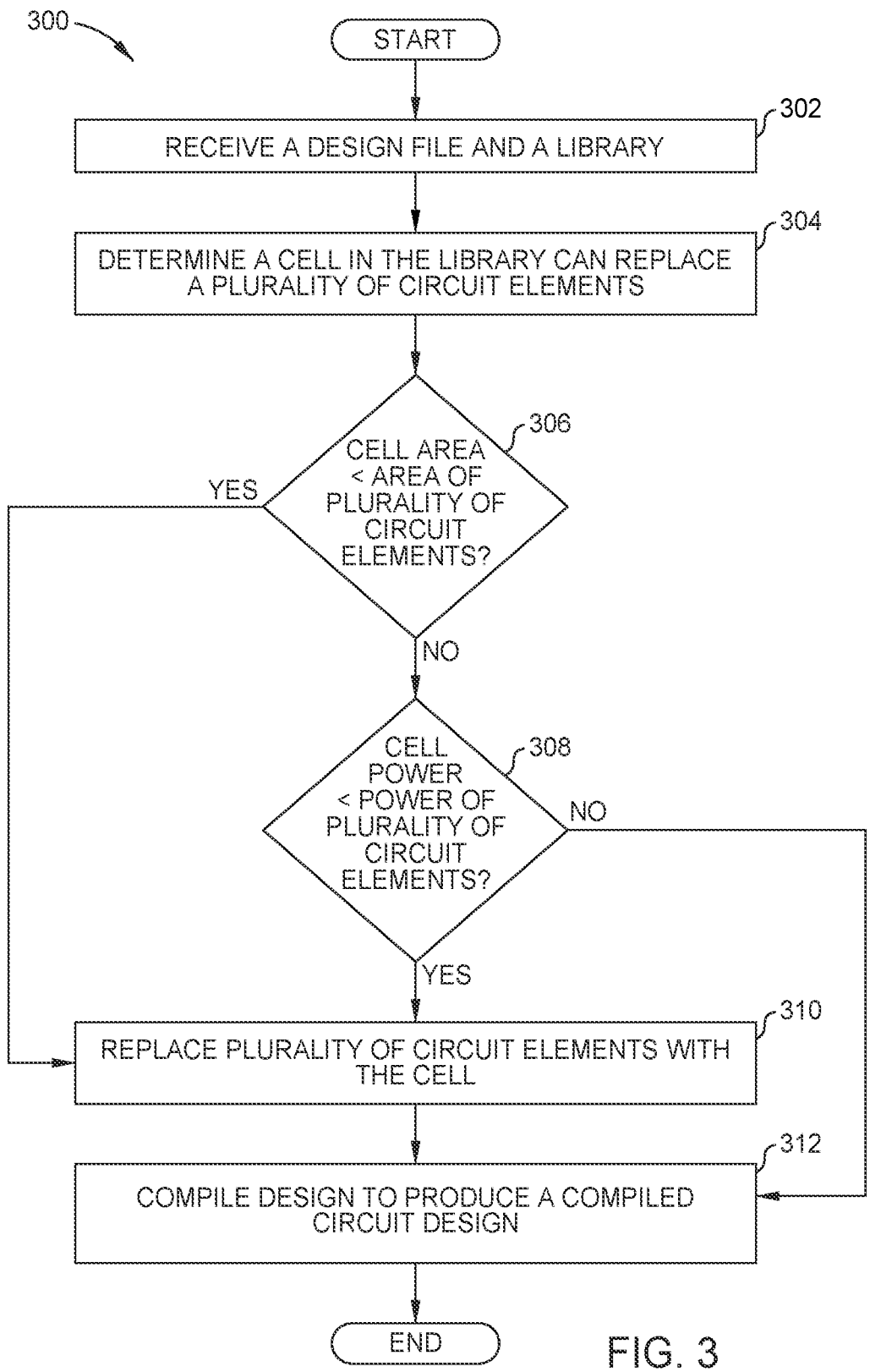
FIG. 3 is a flowchart of a process for compiling a circuit design using the compiler device of FIG. 1.

FIG. 3 is a flowchart of a process 300 for compiling a circuit design. Generally, the compiler device 100 performs the process 300. In particular embodiments, by performing the process 300, the compiler device 100 reduces the area or power consumption of a circuit design.

In 302, the compiler device 100 receives a design file 106 and a library 108. The design file 106 includes a circuit design, and the library 108 includes the definitions of one or more cells. For example, the library 108 may include the definitions of the example cells shown in FIGS. 2A through 2H. Although this disclosure describes certain example cells, this disclosure contemplates the compiler device 100 using any suitable cell during compilation and the library 108 including the definition of any suitable cell. In some embodiments, the compiler device 100 adds to the library 108 a cell that is identical to another cell in the library 108 but the cell has its intermediate outputs exposed whereas the other cell does not.

In 304, the compiler device 100 determines that a cell in the library 108 can replace a plurality of circuit elements in the circuit design of the design file 106. For example, the compiler device 100 may determine that the plurality of circuit elements perform individual functions that are performed collectively by the cell.

In 306, the compiler device 100 determines whether the area of the cell is less than the area of the plurality of circuit elements. If so, then the plurality of circuit elements are identified for replacement with the cell to reduce the area of the circuit, and the compiler device 100 proceeds to 310. In 308, the compiler device 100 determines whether the power consumption of the cell is lower than the power consumption of the plurality of circuit elements. If so, then the plurality of circuit elements are identified for replacement with the cell to reduce power consumption, and the compiler device 100 proceeds to 310.

In 310, the compiler device 100 replaces the plurality of circuit elements identified at 306 or 308 with the cell. As a result, the compiler device 100 replaces the plurality of circuit elements with the cell if the area of the cell is less than the area of the plurality of circuit elements or if the power consumption of the cell is lower than the power consumption of the plurality of circuit elements. In 312, the compiler device 100 compiles the design to produce a compiled circuit design 110. As a result, the outputs of the replaced circuit elements are replaced with the outputs of the cell. Importantly, some of the outputs of the cell are the exposed intermediate outputs of the elements (e.g., gates) within the cell.

Presented differently, the input stage of low-drive multi-stage cells experience very low loads. If the drive strength of the input stage can be made small, significant power savings are possible for a small loss in performance. In older planar nodes, the input stage of multi-stage cells could be sized to be smaller than the output stage to achieve a good performance-power trade-off. The typical drive of the input stage in two stage cells was 0.25× to 0.5× for 1× drive cells, 0.5× to 1× for 2× drive cells, 0.75× to 1.5× for 3× drive cells, etc. This is not possible in advanced nodes, where a mismatch in transistor size between input and output stage forces a diffusion break. The diffusion break increases area and degrades transistor performance, making the overall solution unattractive. As a result, logic libraries in these nodes set the input stage drive to an integral value, which makes it too high for cells with low output drive.

This disclosure identifies three concepts for the compiler device 100:
1. New cells: Construct multi-stage cells by exposing their first and internal stages if those functions exist in the library as independent cells. For cells with gain smaller than the optimal 3-3.5 gain for most processes, the newly exposed outputs can support the additional external fan-out. Construct unit gain cells of drives 2×, 3×, and 4× of high-usage cells such as 2, 3, and 4-input AND, OR, AO* and OA* cells. Similarly, cells with gains of ¾, ⅔, ½ or ⅓ may also be beneficial to support cell usage when the internal output is heavily loaded. Cells with low gains, such as the new ones, proposed may be sub-optimal for the current state of the art where the intermediate output is either not exposed, or when exposed for special purpose logic, experiences very low and predictable loads. The new low gain cells enable gain modulation, which normally happens across discrete cells in a design, to happen within a cell by picking the cell with the appropriate gain.
2. Modeling and characterization: Include the impact of loads on the newly exposed outputs (in addition to the relevant input slew and output load) if they impact the timing arc. This models delay as a function of input slew, output load, and intermediate output load.

3. Usage in design flow: During technology mapping and optimization steps in the flow, multi-stage cells are checked to determine if they should be split into discrete cells corresponding to their building blocks to enable the input stage to drive multiple fan-outs. Mapping to the new cells (e.g., by increasing output drive or reducing the gain of the new cell to meet performance) may yield better area and power, improving performance.

The following are some of the example cells that may be implemented using the above methodology:

1. Simple 2-stage functions BUF, AND2, AND3, AND4, OR2, OR3, OR4, AO21, OA21, AO22 and OA22 with gains that result in an integral drive strength of the input stage which is necessary to meet process design constraint: 1× drive with gain ½ and 1; 2× drive with gain of 1 and 2; 3× drive with gain of 1, 3/2 and 3; and 4× drive with gain of 1, 4/3, 2, and 4.

2. Special purpose arithmetic cells such as ND2EN2 are normally implemented with a single gain for each drive strength. In accordance with this disclosure, they are also implemented for the other drives and gains specified above.

3. Cells for bubbled functions such as ND2B (2-input NAND with 1 inverted input) are also implemented with the same gains and drives with the output of the inverter in the input stage available as an additional output.

4. In general, any multi-stage cell whose intermediate stages compute a function that is implemented in the library as an independent cell may be implemented by exposing those functions as new outputs and offered with the multitude of drives and gains described above.

The disclosed concepts may be implemented in a 7 nm (or other suitable) semiconductor process. The area of the new cells are the same (or smaller) as the original single output cell from which they were derived. The additional functions exposed in the new cells cover 90% of the single stage instances in a typical netlist, offering significant improvement in design level area and power compared to traditional techniques. Implementing the functions of the new cells with discrete cells (for example, the INVBUF_1 cell as two INV_1 cells connected to each other) results in 10-33% improvement in cell area depending on the logic functions and the process characteristics.

Figure 4:
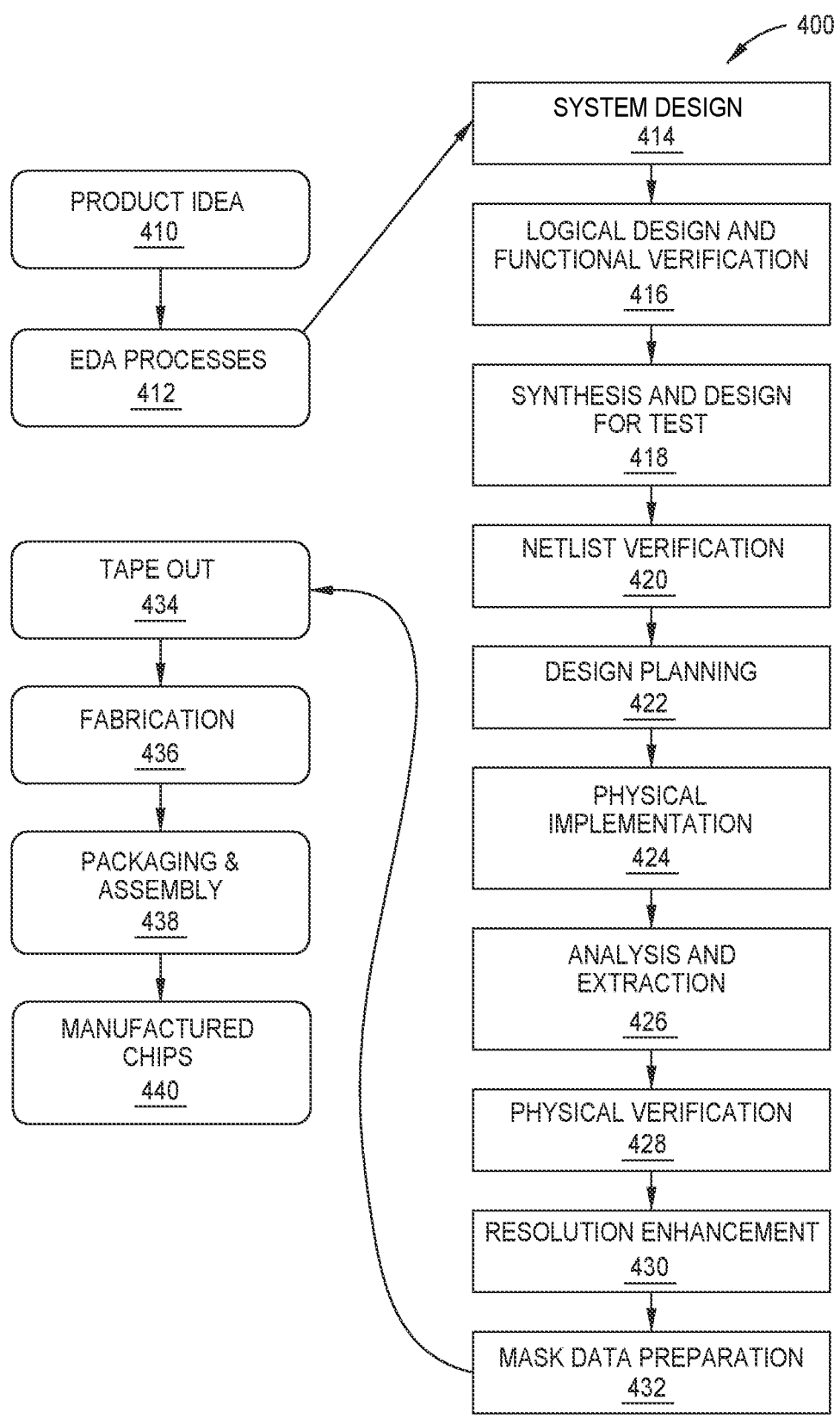
FIG. 4 depicts a flowchart of various processes used during the design and manufacture of an integrated circuit in accordance with some embodiments of the present disclosure.

FIG. 4 illustrates an example set of processes 400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 410 with information supplied by a designer, information which is transformed to create an article of manufacture that uses a set of EDA processes 412. When the design is finalized, the design is taped-out 434, which is when artwork (e.g., geometric patterns) for the integrated circuit is sent to a fabrication facility to manufacture the mask set, which is then used to manufacture the integrated circuit. After tape-out, a semiconductor die is fabricated 436 and packaging and assembly processes 438 are performed to produce the finished integrated circuit 440.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 4. The processes described by be enabled by EDA products.

During system design 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 420, the netlist is checked for compliance with timing constraints and for correspondence with the HDL code. During design planning 422, an overall floor plan for the integrated circuit is constructed and analyzed for timing and top-level routing.

During layout or physical implementation 424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 426, the circuit function is verified at the layout level, which permits refinement of the layout design. During physical verification 428, the layout design is checked to ensure that manufacturing constraints are correct, such as DRC constraints, electrical constraints, lithographic constraints, and that circuitry function matches the HDL design specification. During resolution enhancement 430, the geometry of the layout is transformed to improve how the circuit design is manufactured.

During tape-out, data is created to be used (after lithographic enhancements are applied if appropriate) for production of lithography masks. During mask data preparation 432, the 'tape-out' data is used to produce lithography masks that are used to produce finished integrated circuits.

A storage subsystem of a computer system (such as computer system 500 of FIG. 5) may be used to store the programs and data structures that are used by some or all of the EDA products described herein, and products used for development of cells for the library and for physical and logical design that use the library.

Figure 5:
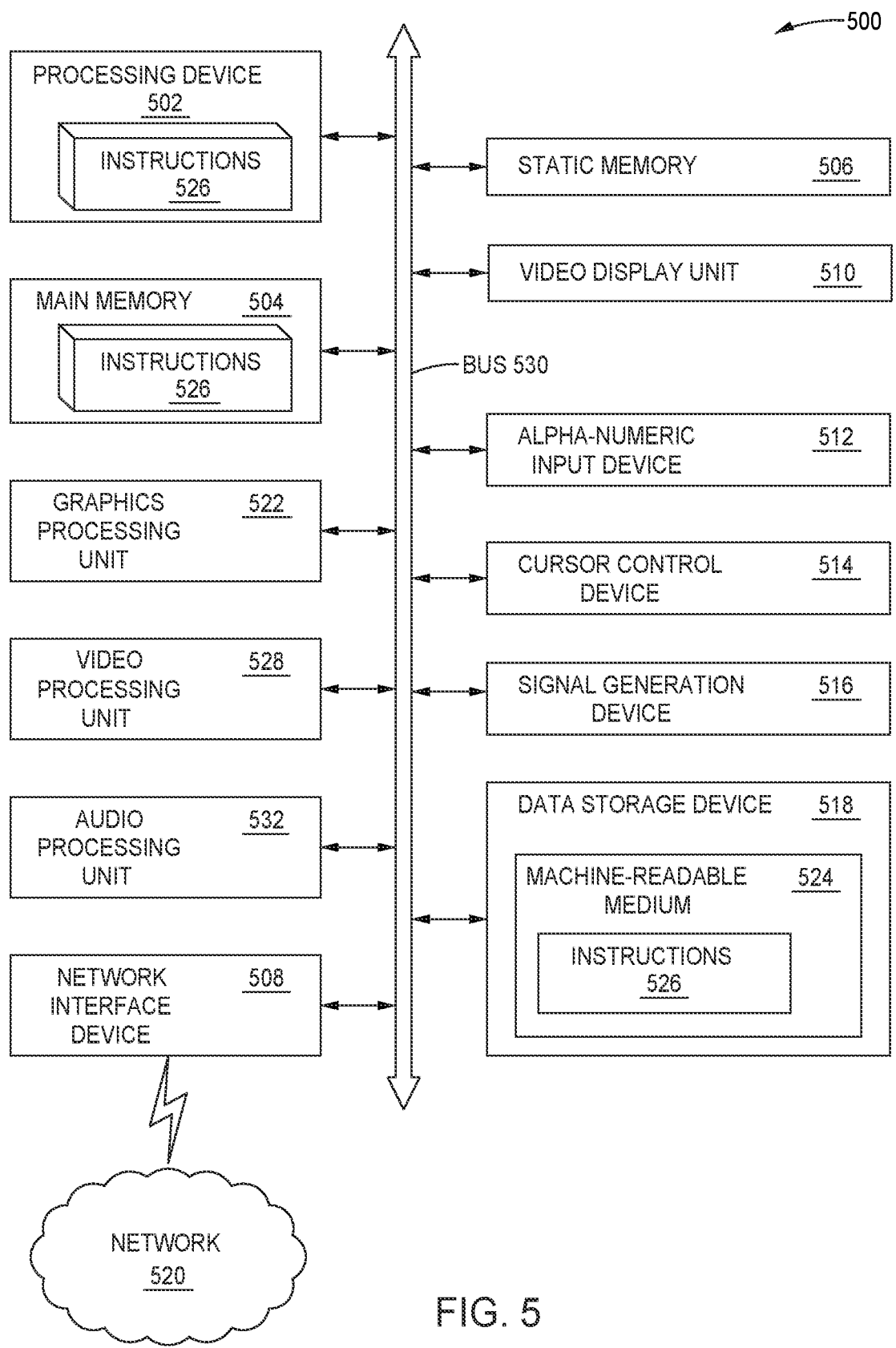
FIG. 5 depicts a diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment. In some embodiments, the compiler device 100 is implemented on the computer system 500.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530. In some embodiments, the processing device 502 is the processor 102 and the main memory 504 is the memory 104.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for compiling a circuit design, the method comprising:
   receiving a circuit design;
   receiving a definition of a cell, wherein the cell comprises (i) one or more inputs, (ii) a first combinational logic circuit element, (iii) a second combinational logic circuit element, (iv) a first output, and (v) a second output different from the first output, wherein:
   the one or more inputs of the cell are coupled to the first combinational logic circuit element;
   an output of the first combinational logic circuit element is coupled to an input of the second combinational logic circuit element;
   the output of the first combinational logic circuit element is exposed as the first output of the cell; and
   the second output of the cell is an output of the second combinational logic circuit element;
   replacing a plurality of circuit elements in the circuit design with the cell; and
   compiling the circuit design after replacing the plurality of circuit elements with the cell, wherein the first and second outputs of the cell in the compiled circuit design replace a plurality of outputs of the plurality of circuit elements.

2. The method of claim 1, further comprising determining a delay for the cell based on a timing model for the cell, wherein the timing model presents the delay for the cell as a function of an input slew of the cell, a load on the first output of the cell, and a load on the second output of the cell.

3. The method of claim 1, wherein replacing the plurality of circuit elements with the cell is based on determining that the cell has a smaller area than the plurality of circuit elements.

4. The method of claim 1, wherein replacing the plurality of circuit elements with the cell is based on determining that the cell has a lower power consumption than the plurality of circuit elements.

5. The method of claim 1, wherein an input of the one or more inputs is coupled to an input of the second combinational logic circuit element.

6. The method of claim 1, wherein the cell further comprises a third combinational logic circuit element and a third output, wherein the output of the second combinational logic circuit element is coupled to an input of the third combinational logic circuit element, and wherein the third output is an output of the third combinational logic circuit element.

7. The method of claim 1, further comprising coupling the first and second outputs to one or more cells.

8. The method of claim 1, wherein the definition of the cell is received in a logic cell library comprising a second cell that is functionally equivalent to the cell and has a gain that is (i) less than or equal to one and (ii) lower than a gain of the cell.

9. The method of claim 1, further comprising adding the cell to a library in response to determining that the library comprises a second cell that is identical to the cell except the second cell lacks the first output.

10. An apparatus for compiling a circuit design, the apparatus comprising a memory and a hardware processor communicatively coupled to the memory, the hardware processor configured to:
    receive a design file for the circuit design;
    receive a logic cell library that defines a cell comprising (i) one or more inputs, (ii) a first combinational logic circuit element, (iii) a second combinational logic circuit element, (iv) a first output, and (v) a second output different from the first output, wherein:
    the one or more inputs of the cell are coupled to the first combinational logic circuit element;
    an output of the first combinational logic circuit element is coupled to an input of the second combinational logic circuit element;
    the output of the first combinational logic circuit element is exposed as the first output of the cell; and
    the second output of the cell is an output of the second combinational logic circuit element;
    replace a plurality of circuit elements in the circuit design with the cell; and
    compile the circuit design after replacing the plurality of circuit elements with the cell, wherein the first and second outputs of the cell in the compiled circuit design replace a plurality of outputs of the plurality of circuit elements.

11. The apparatus of claim 10, the hardware processor further configured to determine a delay for the cell based on a timing model for the cell, wherein the timing model presents the delay for the cell as a function of an input slew of the cell, a load on the first output of the cell, and a load on the second output of the cell.

12. The apparatus of claim 10, wherein replacing the plurality of circuit elements with the cell is based on determining that the cell has a smaller area than the plurality of circuit elements.

13. The apparatus of claim 10, wherein replacing the plurality of circuit elements with the cell is based on determining that the cell has a lower power consumption than the plurality of circuit elements.

14. The apparatus of claim 10, wherein an input of the one or more inputs is coupled to an input of the second combinational logic circuit element.

15. The apparatus of claim 10, wherein the cell further comprises a third combinational logic circuit element and a third output, wherein the output of the second combinational logic circuit element is coupled to an input of the third combinational logic circuit element, and wherein the third output is an output of the third combinational logic circuit element.

16. The apparatus of claim 10, the hardware processor further configured to couple the first and second outputs to one or more cells.

17. The apparatus of claim 10, wherein the logic cell library comprises a second cell that is functionally equivalent to the cell and has a gain that is (i) less than or equal to one and (ii) lower than a gain of the cell.

18. A non-transitory computer-readable medium storing instructions that when executed by a processor, cause the processor to perform an operation comprising:
  replacing a plurality of circuit elements in a circuit design with a cell comprising a first combinational logic circuit element and a second combinational logic circuit element, wherein:
    an output of the first combinational logic circuit element is coupled to an input of the second combinational logic circuit element;
    the output of the first combinational logic circuit element is exposed as the first output of the cell; and
    a second output of the cell is an output of the second combinational logic circuit element; and
  compiling the circuit design, wherein the first and second outputs of the cell in the compiled circuit design replace a plurality of outputs of the plurality of circuit elements.

19. The non-transitory computer-readable medium of claim 18, the operation further comprising determining a delay for the cell based on a timing model for the cell, wherein the timing model presents the delay for the cell as a function of an input slew of the cell, a load on the first output of the cell, and a load on the second output of the cell.

20. The non-transitory computer-readable medium of claim 18, wherein replacing the plurality of circuit elements with the cell is based on determining that the cell has a smaller area than the plurality of circuit elements.

* * * * *